United States Patent
An et al.

(10) Patent No.: US 10,902,244 B2
(45) Date of Patent: Jan. 26, 2021

(54) APPARATUS AND METHOD FOR IMAGE PROCESSING

(71) Applicant: Samsung Electronics Co., Ltd., Suwon-si (KR)

(72) Inventors: Yaozu An, Beijing (CN); Jae-Joon Han, Seoul (KR); Changkyu Choi, Seongnam-si (KR); Chao Zhang, Beijing (CN); Hao Feng, Beijing (CN); Jingtao Xu, Beijing (CN); Yanhu Shan, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 254 days.

(21) Appl. No.: 15/922,237

(22) Filed: Mar. 15, 2018

(65) Prior Publication Data

US 2018/0276455 A1    Sep. 27, 2018

(30) Foreign Application Priority Data

Mar. 27, 2017   (CN) .......................... 2017 1 0187197
Dec. 28, 2017   (KR) ........................ 10-2017-0182979

(51) Int. Cl.
| G06K 9/00 | (2006.01) |
| G06T 7/00 | (2017.01) |
| G06K 9/62 | (2006.01) |
| G06K 9/03 | (2006.01) |
| G06K 9/46 | (2006.01) |

(52) U.S. Cl.
CPC ..... *G06K 9/00288* (2013.01); *G06K 9/00221* (2013.01); *G06K 9/00281* (2013.01); *G06K 9/036* (2013.01); *G06K 9/4628* (2013.01); *G06K 9/6273* (2013.01); *G06T 7/0002* (2013.01); *G06T 2207/20076* (2013.01); *G06T 2207/20081* (2013.01); *G06T 2207/30168* (2013.01); *G06T 2207/30201* (2013.01)

(58) Field of Classification Search
CPC ............ G06K 9/00288; G06K 9/4628; G06K 9/00221; G06K 9/036; G06K 9/6273; G06K 9/00281; G06T 7/0002; G06T 2207/20076; G06T 2207/20081; G06T 2207/30168; G06T 2207/30201
See application file for complete search history.

(56) References Cited

U.S. PATENT DOCUMENTS

| 7,676,149 B2 | 3/2010 | Wu et al. |
| 8,223,258 B2 | 7/2012 | Huang |
| 8,441,548 B1 * | 5/2013 | Nechyba ............ H04N 5/23254 348/222.1 |
| 9,405,960 B2 | 8/2016 | Yin et al. |

(Continued)

FOREIGN PATENT DOCUMENTS

| JP | 2006-39666 A | 2/2006 |
| KR | 10-2005-0091558 A | 9/2005 |

(Continued)

*Primary Examiner* — Bobbak Safaipour
(74) *Attorney, Agent, or Firm* — NSIP Law

(57) ABSTRACT

A processor implemented image processing method includes acquiring a facial image by performing a face detection on an image, performing a quality assessment on the facial image using a preset facial image regression model, and determining a quality level of the facial image based on the quality assessment.

16 Claims, 11 Drawing Sheets

(56) References Cited

U.S. PATENT DOCUMENTS

| | | | |
|---|---|---|---|
| 9,430,629 B1* | 8/2016 | Ziraknejad | G06F 16/583 |
| 9,471,831 B2* | 10/2016 | Kim | G06K 9/00228 |
| 9,530,047 B1 | 12/2016 | Tang et al. | |
| 9,530,071 B2 | 12/2016 | Yin et al. | |
| 2013/0169824 A1 | 7/2013 | Hong et al. | |
| 2014/0328550 A1 | 11/2014 | Liu et al. | |
| 2015/0093040 A1 | 4/2015 | Zhou et al. | |
| 2016/0057338 A1 | 2/2016 | Chen et al. | |
| 2016/0070989 A1* | 3/2016 | Jang | G06K 9/6807 |
| | | | 382/103 |
| 2016/0140436 A1 | 5/2016 | Yin et al. | |
| 2016/0307074 A1 | 10/2016 | Shen et al. | |
| 2017/0337420 A1* | 11/2017 | Wang | G06K 9/00281 |
| 2018/0181796 A1* | 6/2018 | Wang | G06K 9/36 |
| 2018/0300589 A1* | 10/2018 | Levinshtein | G06K 9/00268 |
| 2019/0122404 A1* | 4/2019 | Freeman | G06T 7/251 |
| 2019/0384965 A1* | 12/2019 | Rodriguez | G06K 9/00744 |

FOREIGN PATENT DOCUMENTS

| | | |
|---|---|---|
| KR | 10-2008-0067793 A | 7/2008 |
| KR | 10-2011-0054886 A | 5/2011 |
| KR | 10-1412727 B1 | 6/2014 |
| KR | 10-1687217 B1 | 12/2016 |

* cited by examiner

APPARATUS AND METHOD FOR IMAGE PROCESSING

CROSS-REFERENCE TO RELATED APPLICATIONS

This application claims the benefit under 35 USC § 119(a) of Chinese Patent Application No. 201710187197.8 filed on Mar. 27, 2017 in the State Intellectual Property Office of the People's Republic of China, and Korean Patent Application No. 10-2017-0182979 filed on Dec. 28, 2017 in the Korean Intellectual Property Office, the entire disclosures of which are incorporated herein by reference for all purposes.

BACKGROUND

1. Field

The following description relates to an image processing method and apparatus, and more particularly, to an image processing method and apparatus that may verify a face in an image using a facial image regression model by convolution neural network (CNN) regression training.

2. Description of Related Art

Images collected under uncontrolled conditions like low illumination, shaky camera, and a moving subject, may include a large number of low-quality images having a strong backlit image, a low illumination image, and a blurred image, respectively. The existing image processing approach that relies on high-quality images may not readily verify a face or detect a liveness in a low-quality image.

The existing image processing approaches may enhance an image quality by removing or reducing interference occurring in the image due to external conditions, such as low illumination, through preprocessing. Also, the existing image processing approaches may process a backlit image by dividing an input image into blocks, calculating a brightness based on a block unit, and determining the brightness of a background based on a brightness comparison relationship between small blocks. Also, the existing image processing approaches may process a blurred image by dividing a boundary image of an input image into blocks, calculating a sharpness or a blurriness based on a block unit, and determining the blurriness of an entire image based on the calculated sharpness or blurriness.

If databases are generally similar to each other or if database images in a database likewise have similar illumination or controlled capturing conditions, the existing image processing approaches may preprocess a captured image satisfactorily for use during face verification or liveness test operations that may rely on such databases or database images. However, if multiple databases relied upon in the example face verification or liveness test operations do not have such similar illumination or controlled capturing condition characteristics, or if database images of the database that are relied on in the example face verification or liveness test operations have relatively significant differences in such illumination or controlled capturing condition characteristics, the implementation of such existing image processing approaches may not be able to provide adequately processed images for the example face verification or liveness test operations.

FIG. 1A illustrates a sample example by an existing image processing approach applied to a backlit image type, FIG. 1B illustrates a sample example by an existing image processing approach applied to a low illumination image type, and FIG. 10 illustrates a sample example by an existing image processing approach applied to a blurred image type.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor implemented image processing method includes acquiring a facial image by performing a face detection on an image; performing a quality assessment on the facial image using a preset facial image regression model; and determining a quality level of the facial image based on the quality assessment.

The performing of the quality assessment may include respectively implementing the facial image regression model for each of plural image quality types using a same multi-layer convolutional neural network portion of the facial image regression model for each of the plural image quality types before respective separately trained portions of the facial image regression model for each of the plural image quality types, for the quality assessment.

The method may be a facial verification or liveness test method and may further include adjusting a corresponding facial verification or liveness test threshold based on the determined quality level, and verifying the facial image or a liveness of the facial image based on the adjusted corresponding facial verification or liveness test threshold.

The image processing method may further include determining a threshold based on the quality level; and performing a face verification on the facial image based on the threshold.

The determining of the threshold may include determining the threshold corresponding to the determined quality level, based on a correspondence relationship set between the quality level and the threshold.

The preset facial image regression model may include facial image regression models for image types of the facial image, and each of the image types may be acquired by classifying the facial image into at least one image type and by applying a convolution neural network (CNN) regression training to a training image of each of the image types.

The determining of the quality level may include calculating a weighted average based on the quality assessment; and determining the calculated weighted average as the quality level.

The determining of the quality level may include comparing the quality assessment and a threshold of the corresponding facial image regression model, and determining the quality assessment as the quality level in response to the threshold of the corresponding facial image regression model being less than the quality assessment.

The CNN regression training may be performed based on a facial image and a probability score by acquiring the facial image based on a face detection on the training image and by acquiring the probability score corresponding to a face verification performed on the facial image.

The CNN regression training may use a CNN model, a convolution layer parameter, and a pooling layer parameter that may be shared in response to training a facial image regression model corresponding to each of the image types.

The image type may include a low illumination image type, a backlit image type, and a blurred image type.

In another general aspect, an image processing apparatus includes a processor configured to: to perform a face detection on an image and to output a facial image; and acquire the facial image and perform a quality assessment on the facial image using a preset facial image regression model to determine a quality level of the facial image.

The image processing apparatus may further include a memory configured to store instructions. The processor may be further configured to: execute the instructions to configure the processor to perform the face detection on the image and to output the facial image; and acquire the facial image and perform the quality assessment on the facial image using the preset facial image regression model to determine the quality level of the facial image.

The processor may further be configured to determine a threshold based on the quality level, wherein the threshold may be used to perform a face verification on the facial image.

In another general aspect, a processor implemented image processing method includes acquiring a facial image having an image type of a plurality of image types, the facial image resulting from performing a face detection on an image; performing a quality assessment on the facial image using a facial image regression model corresponding to the image type; determining a weighted average based on the quality assessment of the image type; and performing a face verification on the facial image based on the weighted average.

The facial image regression model may be based on a convolution neural network (CNN) regression training.

The weighted average may determine a quality level of the image type.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
FIG. 1A illustrates a sample example of a backlit image.
Figure 1B:
FIG. 1B illustrates a sample example of a low illumination image.
Figure 1C:
FIG. 1C illustrates a sample example of a blurred image.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, all terms, including technical and scientific terms, used herein have the same meaning as commonly understood by one of ordinary skill in the art to which this disclosure pertains after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

FIGS. 1A through 1O illustrate facial images acquired by performing a face detection on a backlit image, a low illumination image, and a blurred image, respectively, using an existing image processing method.

Herein, the facial images thus refer to images in which face detection, for example, has been performed. In an example, an example recognition apparatus herein may include a camera or image sensor that captures images, which may be respectively reviewed by the processor of the recognition apparatus for the presence of face(s) in the captured images. Such review of the images may include facial feature detection operations, for example. Thus, in this example, an image for which a face has been detected based on the face detection operations may be considered a facial image, e.g., as a result of such face detection. In addition, the face detection may also implement a normalization, cropping, or aligning of the image, the result of which may also be considered a facial image.

Figure 2:
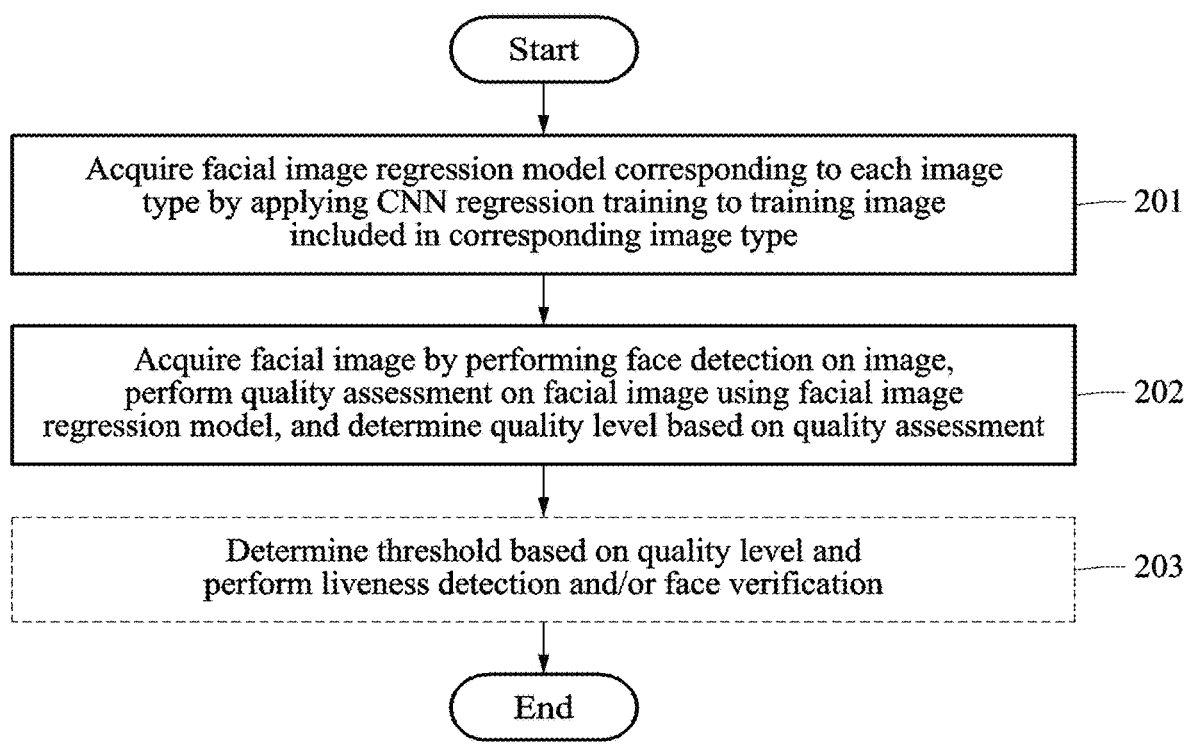
FIG. 2 is a flowchart illustrating an example of an image processing method.

FIG. 2 is a flowchart illustrating an example of an image processing method.

In one example, the image processing method performs an effective quality assessment on an image using facial image regression models corresponding to respectively different image types to enhance the accuracy of quality assessments.

In one example, the image processing method performs an effective quality assessment on a facial image, and dynamically selects a threshold used for a liveness detection and/or a face verification based on the quality assessment. The image processing method applies the threshold to the image quality to be processed. Accordingly, the image processing method reduces misdetections, error detections, and error verification issues occurring since the image to be processed has a significantly low image quality and a significantly high threshold, and enhances the performance of liveness detection and/or face verification in the image. Here, the image may include a low-quality image and a high-quality image.

In one example, there is a need to train the facial image regression models corresponding to different image types based on convolution neural network (CNN) regression training in advance, e.g., so that the efficiency of the image processing method is enhanced. Also, the image processing method may be applied to or combined with an existing image processing method to enhance the performance of the existing image processing method. Also, the image processing method may have a relatively high calculation efficiency.

In detail, in an example of performing a liveness detection using a low-quality image, the image processing method of the liveness detection may perform a quality assessment on an image using a facial image regression model based on CNN regression training, may determine a quality level based on the quality assessment, may adjust a threshold of the liveness detection based on the quality level, and may apply the threshold to the determination of the liveness of the image. Here, the CNN regression training may use a CNN model with convolution layer parameters and pooling layer parameters. Here, each of the image types may share and use the same CNN model that includes convolution layer parameters and pooling layer parameters.

Also, in an example where a face verification is performed using a low-quality image, the image processing method may perform a quality assessment on an image using a facial image regression model based on CNN regression training, may determine a quality level based on the quality assessment, and may adjust a threshold of a face verification based on the quality level. Here, the CNN regression training may use a CNN model, a convolution layer parameter, and a pooling layer parameter. Here, each image type may share the CNN model, the convolution layer parameter, and the pooling layer parameter, and may use the shared CNN model, convolution layer parameter, and pooling layer parameter.

Hereinafter, the image processing method will be described.

Referring to FIG. 2, in operation 201, the image processing method acquires a facial image regression model corresponding to each image type by applying CNN regression training to a training image included in a corresponding image type. Here, to effectively perform an image assessment, facial image regression models corresponding to respectively different image types may be acquired.

The different image types may be acquired by classifying various images based on image characteristics. As non-limiting examples, the plural image types include a low illumination image type, a backlit image type, and a blurred image type but may also include other image types representing other image characteristics.

By applying CNN regression training using respective training images with respect to each image type, a facial image regression model corresponding to each image type may be acquired. For example, the training images may include low-quality images that is a normalized image type. In one example, the training images include at least one of a normalized backlit image, a normalized low illumination image, and a normalized blurred image. Alternatively, the training image may include a high-quality image that includes a face.

In one example, a facial image regression model is configured and stored in advance or may be continuously updated and stored. Accordingly, when performing a liveness detection and/or a face verification, the stored facial image regression model is used.

In one example, CNN regression training to be applied to a facial image regression model is configured and stored in advance or may be continuously updated and stored. Accordingly, in the example of the liveness detection and/or face verification, the stored CNN regression training is used.

In operation 202, the image processing method acquires a facial image by performing a face detection on an image, performing a quality assessment on the facial image using the facial image regression model, and determining a quality level based on the quality assessment. Here, the facial image regression model may correspond to each different image type.

Here, the face detection relates to detecting a facial portion in an image and the facial image may include a face. The image processing method may perform appropriate processing of a low-quality image. Also, without being limited to processing of the low-quality image, the image processing method may perform processing of an image with a different quality in addition to the low-quality image.

The image processing method determines the quality level of the image by performing the quality assessment on the facial image using the facial image regression model and by collecting results of the quality assessment. The image processing method may determine a collective quality level by effectively performing the quality assessment on different image types with respect to the facial image acquired from the image to be processed.

In operation 203, the image processing method determines a threshold based on the quality level and performs a liveness detection and/or a face verification on the facial image based on the threshold. Operation 203 may use the quality level determined in operation 202.

Here, the threshold may be adjusted based on the quality level of the image to be processed. That is, the threshold may be dynamically adjusted. The performance of liveness detection and/or face verification may be enhanced by performing the liveness detection and/or the face verification using the adjusted threshold.

Hereinafter, each of operations 201 through 203 will be described in detail. Here, an image type will be described using three image types, for example, a backlit image type, a low illumination image type, and a blurred image type.

Initially, operation 201 of acquiring a facial image regression model will be described.

Facial image regression models corresponding to the respective image types, for example, a backlit image type, a low illumination image type, and a blurred image type, may be acquired by applying CNN regression training to a training image included in each image type.

Here, CNN regression training may be performed based on a facial image and a probability score by acquiring the facial image based on a face detection on the training image and by acquiring the probability score corresponding to a face verification from the facial image.

Figure 3:
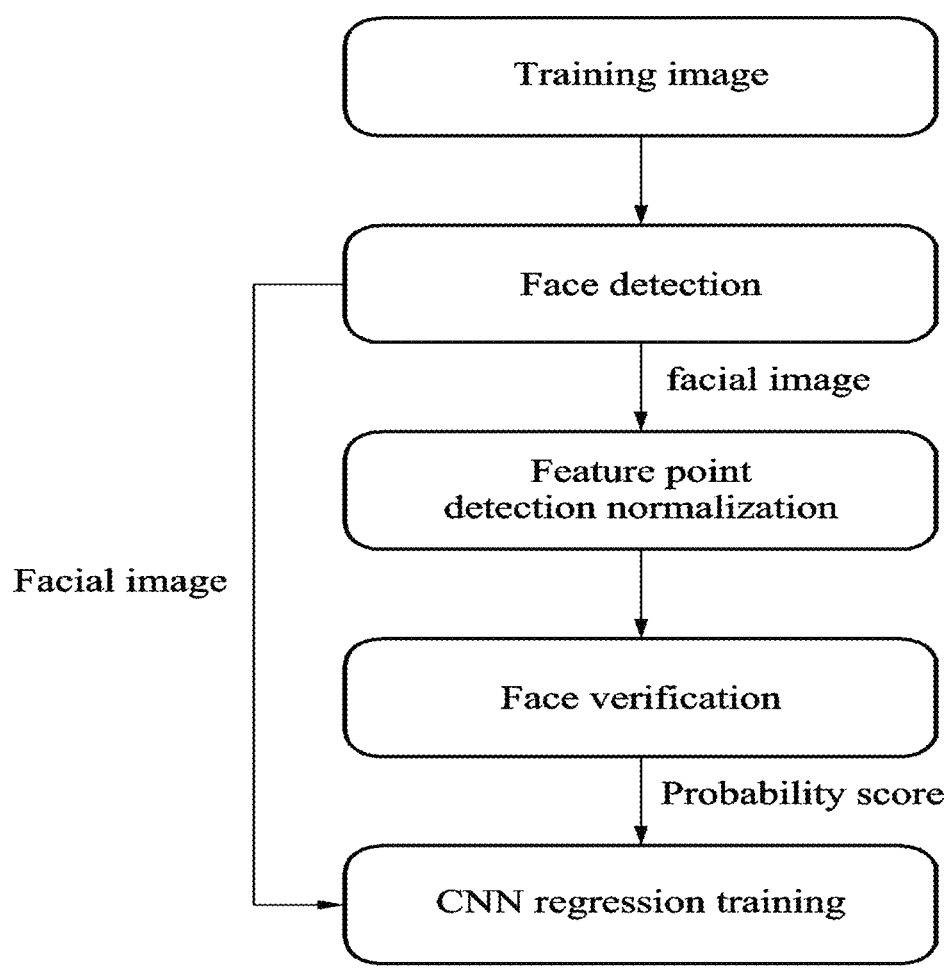
FIG. 3 illustrates an example of describing a convolution neural network (CNN) regression training.

The CNN regression training will be further described with reference to FIG. 3. FIG. 3 illustrates an example of describing the CNN regression training.

Referring to FIG. 3, a facial image is acquired by performing a face detection on a training image. A feature point detection normalization is performed on the acquired facial image and a face verification is performed. The facial image and a probability score acquired through the face verification are used for CNN regression training. A facial image regression model may be acquired by applying the CNN regression training.

For example, a facial image regression model corresponding to a backlit image type, a facial image regression model corresponding to a low illumination image type, and a facial image regression model corresponding to a blurred image type are acquired by applying CNN regression training.

The CNN regression training may use a CNN model, a convolution layer parameter, and a pooling layer parameter. Here, to save storage capacity and to enhance a calculation effect, the same CNN model, convolution layer parameter, and pooling layer parameter may be used for the facial image regression models corresponding to the different image types.

For example, to save the storage capacity and to enhance the calculation effect, the facial image regression model corresponding to the backlit image type, the facial image regression model corresponding to the low illumination image type, and the facial image regression model corresponding to the blurred image type use the same CNN model, convolution layer parameter, and pooling layer parameter.

Figure 4:
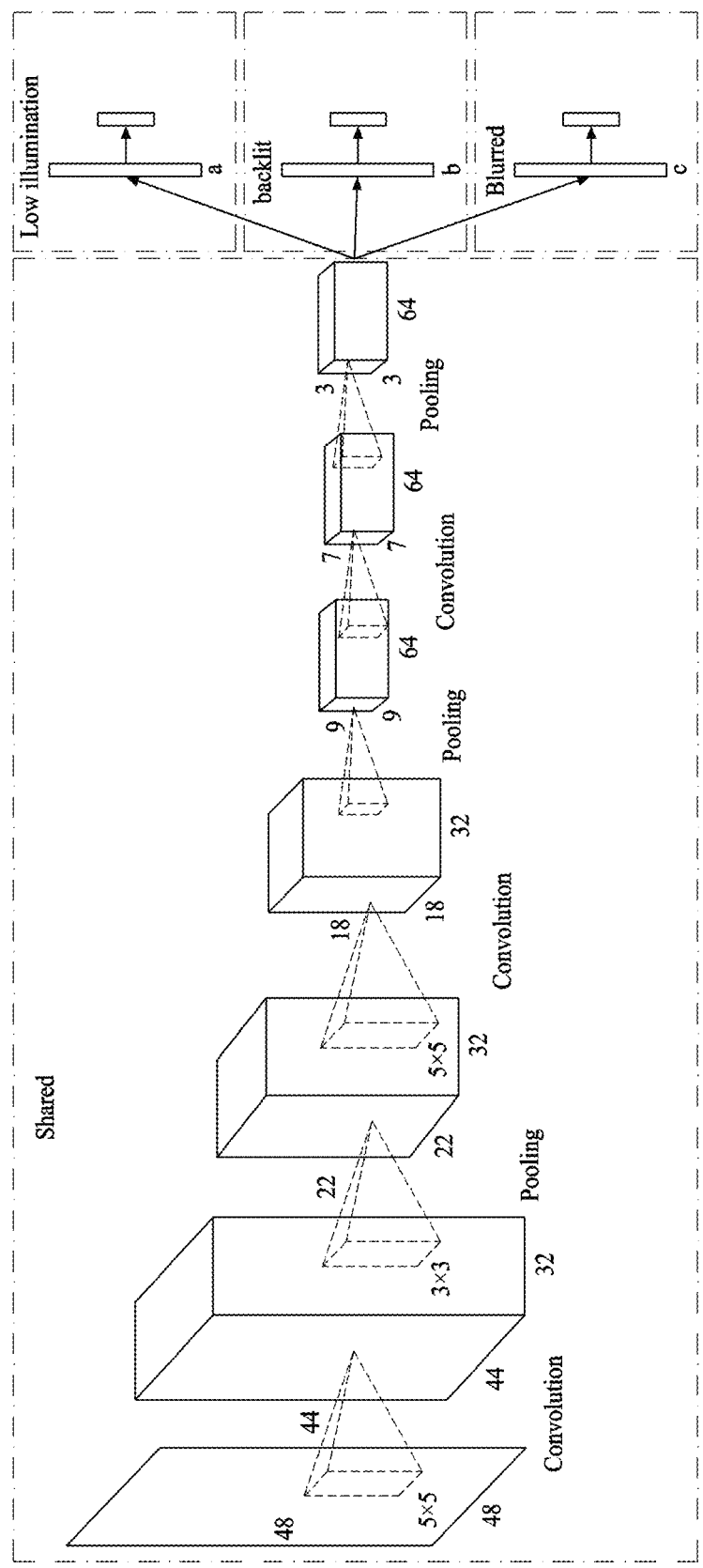
FIG. 4 illustrates an example of a CNN model.

FIG. 4 illustrates an example of describing a CNN model. The CNN model of FIG. 4 may be applied to three different image types. The CNN includes a plurality of layers, for example, seven hidden layers, and an output layer from left to right.

Here, the seven hidden layers include a first convolution layer (also, referred to as a first filter layer), a first pooling layer, a second convolution layer, a second pooling layer, a third convolution layer, a third pooling layer, and a full connection layer sequentially from left to right. A facial image regression model may acquire training parameters by performing training on parameters of all convolution layers, pooling layers, and full connection layers.

In detail, referring to FIG. 4, an illustrated first rectangle from the left of FIG. 4 denotes the input layer, the rectangle with a height of 48 and a depth of 48 represents a matrix including 48*48 nodes or neurons. For example, the matrix may correspond to or be a pixel point matrix including 48*48 pixel points of an input image that is provided to the CNN.

Next from the left in FIG. 4 is the first illustrated parallelepiped volume with a height of 44, a depth of 44, and a width of 32. The parallelepiped volume may represent 32 feature maps resulting from the implementation of a first convolution layer, e.g., acquired by the input image passing through the first convolution layer, as represented by the example illustrated convolution between the input layer and the first parallelepiped volume. Each of the 32 feature maps in the illustrated first parallelepiped volume may include 44*44 pixel points.

Next from the left in FIG. 4 is the second illustrated parallelepiped volume with a height of 22, a depth of 22, and a width of 32. The second parallelepiped volume may represent 32 feature maps resulting from the implementation of a first pooling layer, e.g., acquired by pooling or sampling by the first pooling layer of the 32 feature maps produced by the first convolution layer, as represented by the example illustrated pooling or sampling between the first parallelepiped volume and the second parallelepiped volume. Here, each of the 32 feature maps illustrated in the second parallelepiped volume may include 22*22 pixel points due to the pooling or sampling by the first pooling layer.

Next from the left in FIG. 4 is the third illustrated parallelepiped volume with a height of 18, a depth of 18, and a width of 32. The third parallelepiped volume may represent 32 feature maps resulting from the implementation of a second convolution layer, e.g., acquired by the 32 feature maps from the first pooling layer passing through the second convolution layer, as represented by the example illustrated convolution between the second parallelepiped volume and the third parallelepiped volume. Here, each of the 32 feature maps in the illustrated third parallelepiped volume may include 18*18 pixel points.

Next from the left in FIG. 4 is the fourth illustrated parallelepiped volume with a height of 9, a depth of 9, and a width of 64. The fourth parallelepiped volume may represent 64 feature maps resulting from the implementation of a second pooling layer, e.g., acquired by pooling or sampling by the second pooling layer of the 32 feature maps produced by the second convolution layer, as represented by the example illustrated pooling or sampling between the third parallelepiped volume and the fourth parallelepiped volume. Here, each of the 64 feature maps illustrated in the fourth parallelepiped volume may include 9*9 pixel points due to the pooling or sampling by the second pooling layer.

Next from the left in FIG. 4 is the fifth illustrated parallelepiped volume with a height of 7, a depth of 7, and a width of 64. The fifth parallelepiped volume may represent 64 feature maps resulting from the implementation of a third convolution layer, e.g., acquired by the 64 feature maps from the second pooling layer passing through the third convolution layer, as represented by the example illustrated convolution between the fourth parallelepiped volume and the fifth parallelepiped volume. Here, each of the 64 feature maps using the third convolution layer result may include 7*7 pixel points.

Next from the left in FIG. 4 is the sixth illustrated parallelepiped volume with a height of 3, a depth of 3, and a width of 64. The sixth parallelepiped volume may represent 64 feature maps resulting from the implementation of a third pooling layer, e.g., acquired by pooling or sampling by the third pooling layer of the 64 feature maps produced by the third convolution layer, as represented by the example illustrated pooling or sampling between the fifth parallelepiped volume and the sixth parallelepiped volume. Here, each of the 64 feature maps illustrated in the sixth parallelepiped volume may include 3*3 pixel points due to the pooling or sampling by the third pooling layer.

Next from the left in FIG. 4 is a full connection layer portion of the CNN. The full connection layer portion may include respective full connection layers, e.g., illustrated as the low illumination full connection layer, the backlight full connection layer, and the blurred full connection layer, each of which may provide respective results. Here, the illustrated variable below each of the full connection layer represents a variable number of nodes or neurons included in the corresponding full connection layer. For example, the variable "a" below the low illumination full connection layer of the low illumination image type indicates that the low illumination full connection layer includes a nodes or neurons, where the variable "a" may be an integer value greater than zero. Also, the variable "b" below the backlight full connection layer of a backlit image type indicates that the backlight full connection layer includes b nodes or neurons, where the variable "b" may be an integer value greater than zero. Also, the variable "c" below the blurred full connection layer of a blurred image type indicates that the blurred full connection layer includes c nodes neurons, where the variable "c" may be an integer value greater than zero.

The respective farthest right illustrated rectangles in FIG. 4 denote respective output layers of the corresponding full connection layers. The illustrated separate output layers may also be representative of a single output layer where the respective results or all provided, selectively provided, or singly provided. Thus, the output layer may output a result corresponding to a facial image regression model. Each node or neuron of the full connection layers may be independently respectively connected to each node or neuron of the third pooling layer. Also, each node or neuron of the output layer(s) may be independently connected to each node neuron of the respective full connection layers. There may also be connection weighting between any of the nodes or neurons of the respective layers that may also be trained in the facial image regression model.

CNN regression training applied to acquire facial image regression models corresponding to different image types may enhance the calculation efficiency by sharing parameters of six hidden layers in the CNN model, e.g., corresponding to the first through third convolution and pooling layers, and may also reduce the storage capacity, while the respective parameters of the different full connection layers may be distinguished from each other based on different image types.

Hereinafter, operation 202 of performing a quality assessment will be described.

Figure 5:
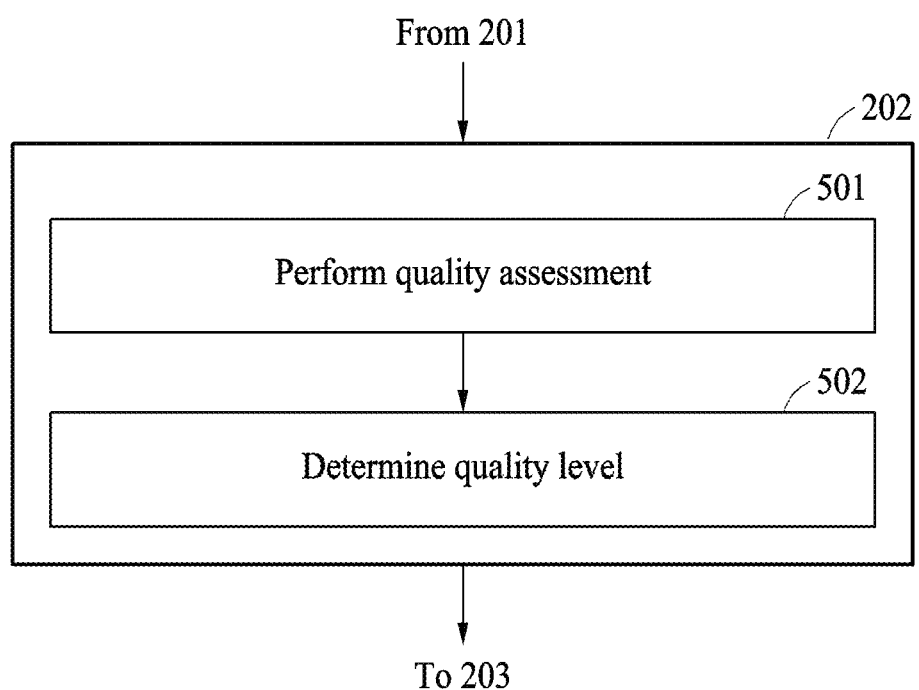
FIG. 5 is a flowchart illustrating an example of an operation of assessing a quality level of FIG. 2.

A process of assessing a quality level will be described with reference to FIG. 5. FIG. 5 is a flowchart illustrating an example of operation 202 of assessing a quality level of FIG. 2. Referring to FIG. 5, a quality assessment of a facial image is performed on three image types using facial image regression models corresponding to the three different image types in operation 501, and a quality level is assessed using the quality assessment performed on the three image types in operation 502.

In detail, the quality level may be determined based on the quality assessment performed on the three image types using the following two methods. However, they are provided as examples only.

First, a weighted average may be calculated based on the quality assessment of the three image types and the calculated weighted average may be determined as the quality level. For example, quality level=(quality assessment of low illumination image type+quality assessment of backlit image type+assessment of blurred image type)/3.

Second, a quality assessment corresponding to each image type and a threshold T of a facial image regression model are compared. If the quality assessment is less than the threshold T of the facial image regression model, the quality assessment corresponding to the image type may be determined as the quality level. Once the quality level is determined, a process of comparing the quality assessment and the threshold of the facial image regression model may be terminated.

Here, a priority of each image type may be set. The quality level may be determined by comparing the quality assessment and the threshold of the facial image regression model sequentially in descending order of the priority.

For example, the priority is set as low illumination image type>backlit image type>blurred image type and the threshold T of the facial image regression model is 0.5. Here, if the quality assessment of the low illumination image type is less than the threshold T based on the priority, the quality assessment of the low illumination image type may be determined as the quality level. Otherwise, if the quality assessment of the low illumination image type is greater than the threshold T, a facial image of the low illumination image type may be determined as a high-quality image.

Also, if the quality assessment of the backlit image type is less than the threshold T, the quality assessment of the backlit image type may be determined as the quality level. Otherwise, if the quality assessment of the backlit image type is greater than the threshold T, a facial image of the backlit image type may be determined as a high-quality image.

Also, if the quality assessment of the blurred image type is less than the threshold T, the quality assessment of the blurred image type may be determined as the quality level. Otherwise, if the quality assessment of the blurred image type is greater than the threshold T, a facial image of the blurred image type may be determined as a high-quality image.

Hereinafter, operation 203 of determining a threshold will be described.

A threshold used for a liveness detection and/or a face verification may be determined based on the quality level determined in operation 202. A process of determining a threshold will be further described with reference to FIGS. 6 and 7.

Figure 6:
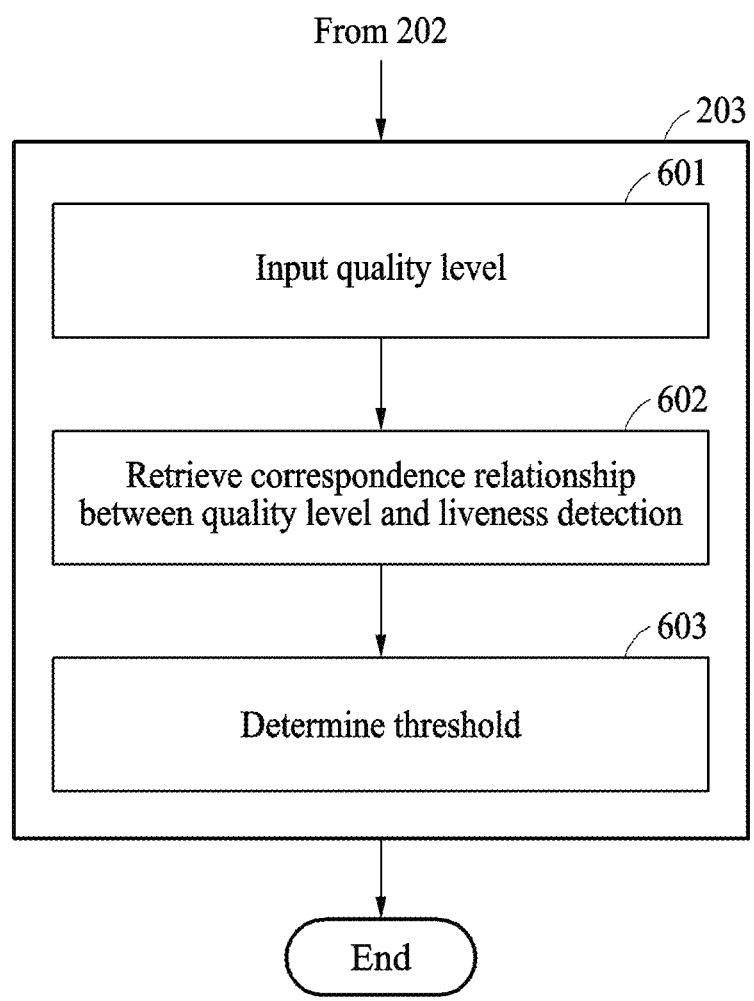
FIG. 6 is a flowchart illustrating an example of determining a threshold used for a liveness detection in an operation of determining the threshold of FIG. 2.

FIG. 6 illustrates an example of determining a threshold used for a liveness detection in operation 203 of FIG. 2. Referring to FIG. 6, a correspondence relationship between a quality level and a liveness detection may be preset. In response to the quality level being input in operation 601, the correspondence relationship between the quality level and the liveness detection is retrieved in operation 602 and the threshold used for the liveness detection is determined in operation 603. Here, the correspondence relationship may be represented as shown in the following Table 1.

Figure 7:
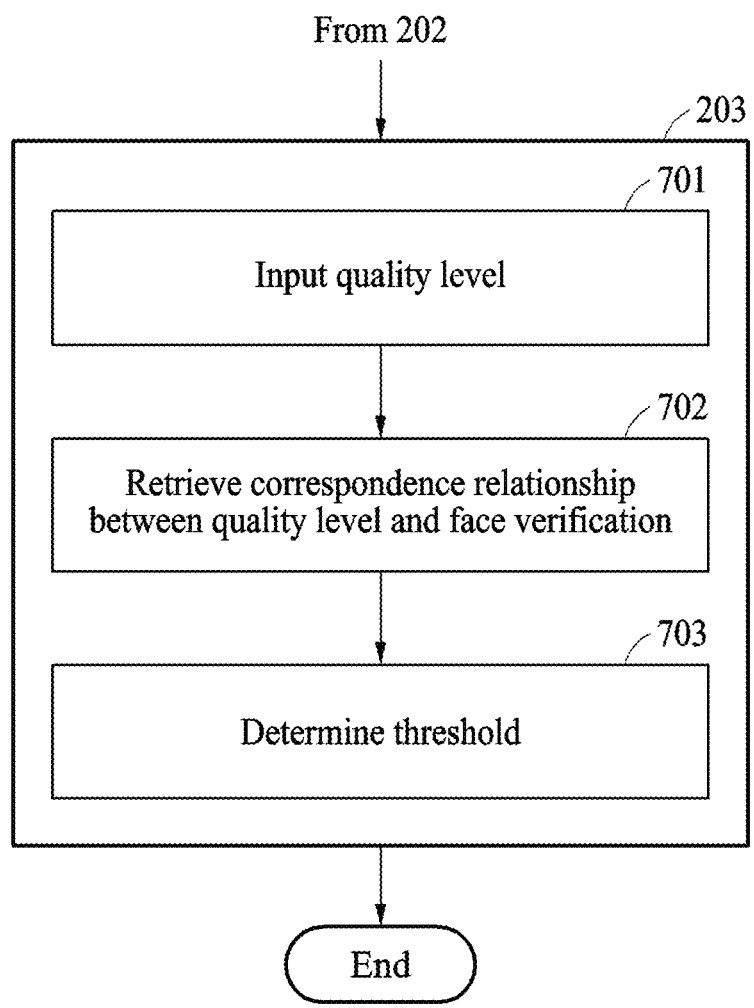
FIG. 7 is a flowchart illustrating an example of determining a threshold used for a face verification in an operation of determining the threshold of FIG. 2.

FIG. 7 illustrates an example of determining a threshold used for a face verification in operation 203 of FIG. 2. Referring to FIG. 7, a correspondence relationship between a quality level and a face verification may be preset. In response to the quality level being input in operation 701, the correspondence relationship between the quality level and the face verification is retrieved in operation 702 and the threshold used for the face verification is determined in operation 703. Here, the correspondence relationship may be represented as shown in the following Table 1.

TABLE 1

|  | 0 < quality level < 0.3 | 0.3 < quality level < 0.6 | 0.6 < quality level < 1 |
|---|---|---|---|
| threshold | 0.9 | 0.7 | 0.5 |

An algorithm used for the liveness detection, for example, a classification algorithm based on a deep convolution neural network and a classification algorithm based on a local two value mode operator and a support vector machine, and/or an algorithm used for the face verification, for example, a classification algorithm based on a depth convolution neural network, are used. The threshold may be dynamically determined based on the aforementioned quality level. Accordingly, when performing the liveness detection and/or face verification, a further robust effect may be achieved.

Figure 8:
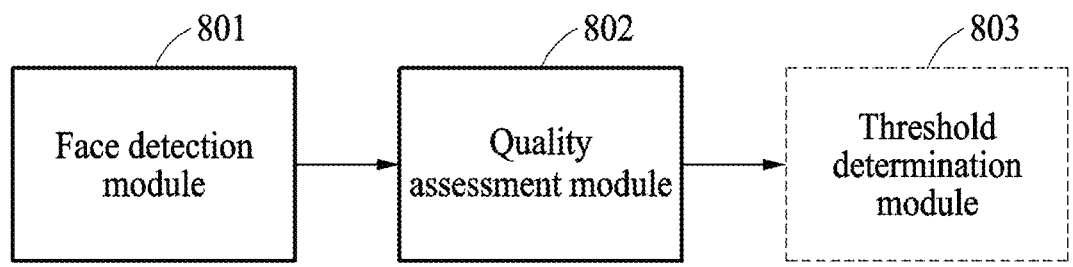
FIG. 8 is a diagram illustrating an example of an image processing apparatus.

FIG. 8 illustrates an example of an image processing apparatus.

The aforementioned image processing method may be performed by the image processing apparatus. Referring to FIG. 8, the image processing apparatus includes a face detection module 801 and a quality assessment module 802. Here, the face detection module 801 performs a face detection on an image to be processed and outputs a facial image of the face detection to the quality assessment module 802. The quality assessment module 802 performs a quality assessment on the facial image using a facial image regression model corresponding to each of at least one image type, and may determine the quality level.

The image processing apparatus may further include a threshold determination module 803. The threshold determination module 803 determines the threshold based on the quality level. The threshold may be used for the liveness detection and/or the face verification.

In an example, a processor in a terminal may be configured to output the liveness detection and/or the face verification of a facial image or provide a user with the output of the processor through the terminal.

Figure 9:
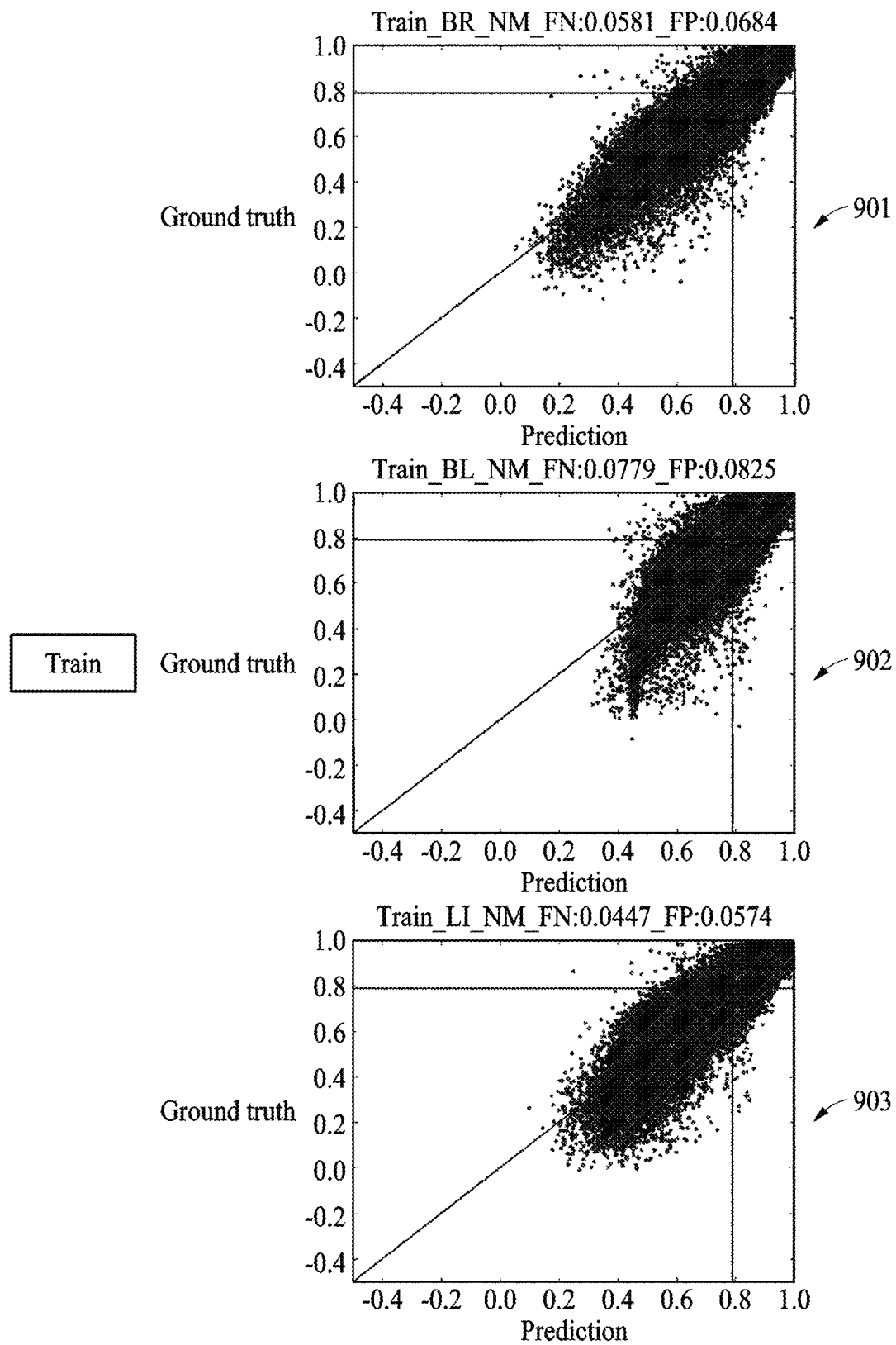
FIG. 9 illustrates graphs showing results of training a facial image regression model of a low illumination image type, a facial image regression model of a backlit image type, and a facial image regression model of a blurred image type.
Figure 10:
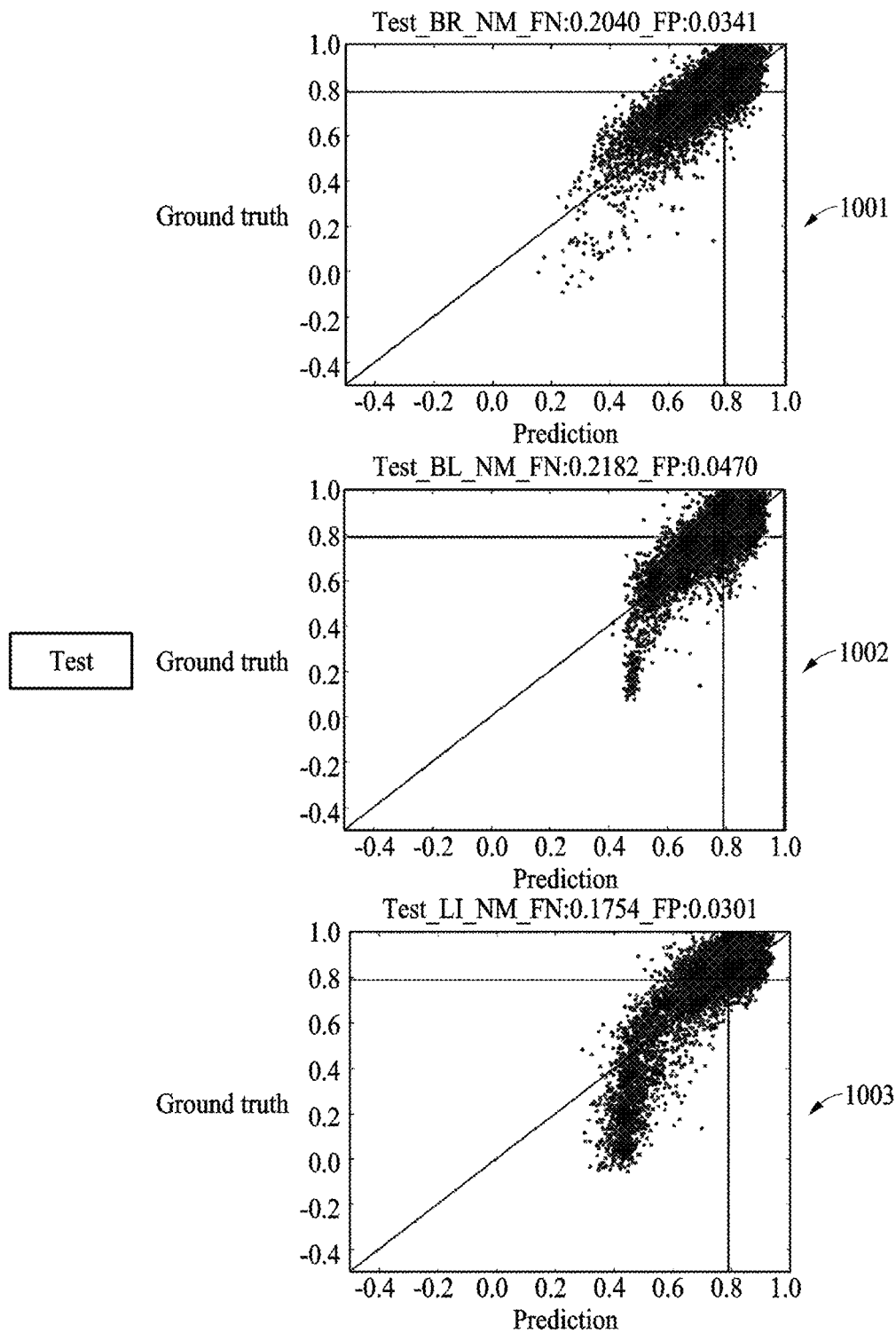
FIG. 10 illustrates graphs showing test results.

FIG. 9 illustrates graphs 901, 902, and 903 showing results of training a facial image regression model of a low illumination image type, a facial image regression model of a backlit image type, and a facial image regression model of a blurred image type. FIG. 10 illustrates graphs 1001, 1002, and 1003 showing test results.

A low illumination plus normal image are used to train the facial image regression model of the low illumination image type, a backlight plus normal image are used to train the facial image regression model of the backlit image type, and the blurred plus normal image are used to train the facial image regression model of the blurred image type.

The graph 903 shows a result of training the facial image regression model of the low illumination image type, the graph 902 shows a result of training the facial image regression model of the backlit image type, and the graph 901 shows a result of training the facial image regression model of the blurred image type.

The graph 1003 shows a test result using the facial image regression model of the low illumination image type. The graph 1002 shows a test result using the facial image regression model of the backlit image type. The graph 1001 shows a test result using the facial image regression model of the blurred image type.

Referring to FIGS. 9 and 10, it is seen that a relatively high degree of matching and accuracy are achieved, and the low-quality image processing performance using a facial image regression model corresponding to each image type is effectively enhanced.

The face detection module 801, the quality assessment module 802, and the threshold determination module 803 in FIG. 8 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2, 3, 5, 6, and 7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

As a non-exhaustive example only, a terminal as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented image processing method, comprising:
    acquiring a facial image by performing a face detection on an image;
    performing a quality assessment on the facial image using a preset facial image regression model; and
    determining a quality level of the facial image based on the quality assessment,
    wherein the performing of the quality assessment includes respectively implementing the facial image regression model for each of plural image quality types using a same multi-layer convolutional neural network portion of the facial image regression model for each of the plural image quality types before respective separately trained portions of the facial image regression model for each of the plural image quality types, for the quality assessment.

2. The method of claim 1, wherein the method is a facial verification or liveness test method and further comprises adjusting a corresponding facial verification or liveness test threshold based on the determined quality level, and verifying the facial image or a liveness of the facial image based on the adjusted corresponding facial verification or liveness test threshold.

3. The method of claim 1, further comprising:
determining a threshold based on the quality level; and
performing a face verification on the facial image based on the threshold.

4. The method of claim 3, wherein the determining of the threshold comprises determining the threshold corresponding to the determined quality level, based on a correspondence relationship set between the quality level and the threshold.

5. The method of claim 1,
wherein the preset facial image regression model comprises facial image regression models for image types of the facial image, and each of the image types is acquired by classifying the facial image into at least one image type and by applying a convolution neural network (CNN) regression training to a training image of each of the image types.

6. The image processing method of claim 5, wherein the determining of the quality level comprises:
calculating a weighted average based on the quality assessment; and
determining the calculated weighted average as the quality level.

7. The image processing method of claim 5, wherein the determining of the quality level comprises:
comparing the quality assessment and a threshold of the facial image regression model; and
determining the quality assessment as the quality level in response to the threshold of the facial image regression model being less than the quality assessment.

8. The image processing method of claim 5, wherein the CNN regression training is performed based on a facial image and a probability score by acquiring the facial image by performing a face detection on the training image, and by acquiring the probability score corresponding to a face verification performed on the facial image.

9. The image processing method of claim 8, wherein the CNN regression training uses a CNN model including convolution layer parameters and pooling layer parameters that are shared in response to training a facial image regression model corresponding to each of the image types.

10. The image processing method of claim 5, wherein the image types comprise a low illumination image type, a backlit image type, and a blurred image type.

11. An image processing apparatus, comprising:
a processor configured to:
perform a face detection on an image and to output a facial image; and
acquire the facial image and perform a quality assessment on the facial image using a preset facial image regression model to determine a quality level of the facial image,
wherein the quality assessment includes respectively implementing the facial image regression model for each of plural image quality types using a same multi-layer convolutional neural network portion of the facial image regression model for each of the plural image quality types before respective separately trained portions of the facial image regression model for each of the plural image quality types, for the quality assessment.

12. The image processing apparatus of claim 11, further comprising a memory configured to store instructions;
wherein the processor is further configured to execute the instructions to configure the processor to:
perform the face detection on the image and to output the facial image; and
perform the acquiring of the facial image and the quality assessment on the facial image using the preset facial image regression model to determine the quality level of the facial image.

13. The image processing apparatus of claim 11, wherein the processor is further configured to determine a threshold based on the quality level, wherein the threshold is used to perform a face verification on the facial image.

14. A processor implemented image processing method, comprising:
acquiring a facial image having an image type of a plurality of image types, the facial image resulting from performing a face detection on an image;
performing a quality assessment on the facial image using a facial image regression model corresponding to the image type of the plurality of image types;
determining a weighted average based on the quality assessment of the image types; and
performing a face verification on the facial image based on the weighted average for a terminal,
wherein the performing of the quality assessment includes respectively implementing the facial image regression model for each of plural image quality types using a same multi-layer convolutional neural network portion of the facial image regression model for each of the plural image quality types before respective separately trained portions of the facial image regression model for each of the plural image quality types, for the quality assessment.

15. The method of claim 14, wherein the facial image regression model based on a convolution neural network (CNN) regression training.

16. The method of claim 14, wherein the weighted average determines a quality level of the image type.

* * * * *